United States Patent [19]

Lee

[11] Patent Number: 4,599,823
[45] Date of Patent: Jul. 15, 1986

[54] FLEA CATCHER

[76] Inventor: Jin G. Lee, 718 34th Ave., San Francisco, Calif. 94121

[21] Appl. No.: 612,709

[22] Filed: May 21, 1984

[51] Int. Cl.⁴ .............................................. A01M 3/00
[52] U.S. Cl. ....................................... 43/134; 119/91; 119/156; 132/88.5; 401/21; 401/268
[58] Field of Search ................. 43/134, 133, 138, 142; 119/87, 83, 91, 156; 132/112, 88.5, 88.7; 401/283, 268, 21

[56] References Cited

U.S. PATENT DOCUMENTS

| | | | |
|---|---|---|---|
| 506,643 | 10/1893 | Price | 43/134 |
| 1,107,537 | 8/1914 | McCann | 43/134 |
| 1,255,601 | 0/1918 | Hare | 43/134 |
| 1,776,981 | 9/1930 | Rae | 401/21 |
| 3,980,047 | 9/1976 | Cohen | 401/21 |
| 4,407,219 | 10/1983 | Dellevoet | 401/283 |

Primary Examiner—Gene P. Crosby
Attorney, Agent, or Firm—Alvin E. Hendricson

[57] ABSTRACT

A flea catcher having a housing with an open front and a guard is disclosed. The housing has a fine toothed comb extending forwardly from the bottom thereof with a cylindrical brush mounted for rotation atop the comb ahead of a soft absorbent material such as a sponge adapted for impregnation with an insecticide. The brush is resiliently mounted for self adjustment to accommodate thin or thick hair.

5 Claims, 5 Drawing Figures

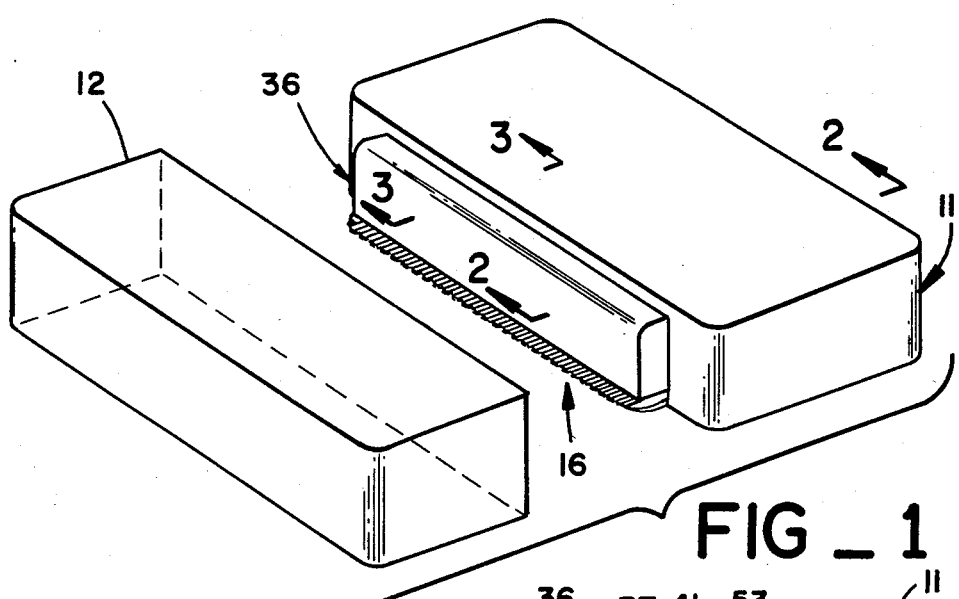
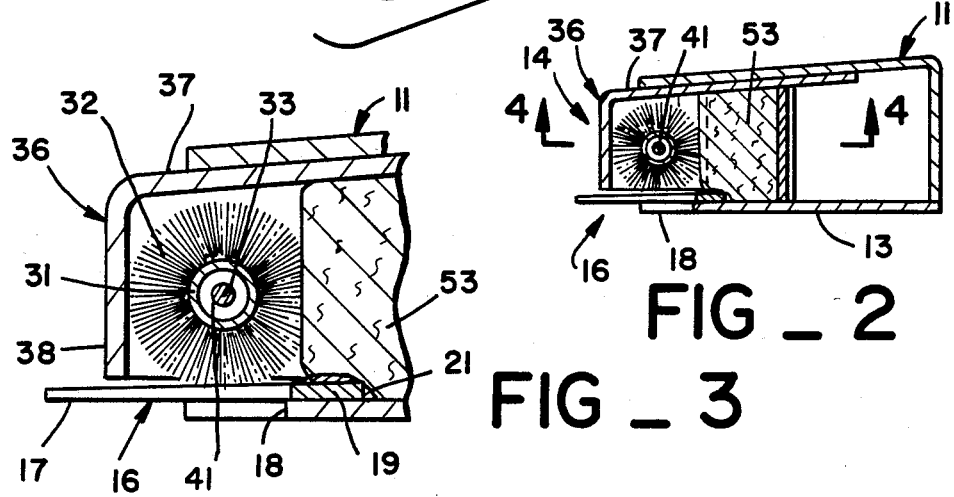
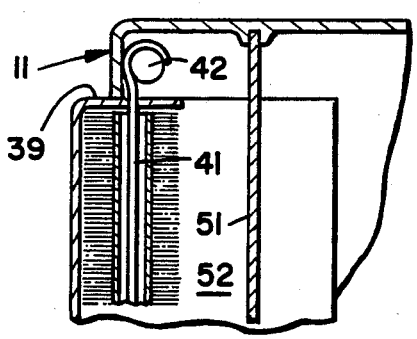
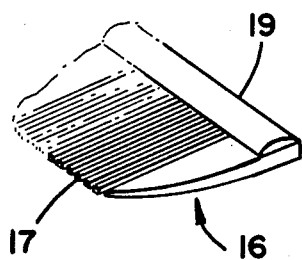

FLEA CATCHER

The present invention provides a combined comb and a rotatable brush for removing insects such as fleas from animals such as cats and dogs and exterminating same.

BACKGROUND OF INVENTION

House pets, such as cats and dogs, that are covered with hair are prone to be carriers of fleas and possibly other insects that reside in the hair covering of the animals. Removal and extermination of such fleas and the like from animals may be quite difficult but should be accomplished on a regular and frequent basis in order to prevent a major infestation.

There have been proposed various devices for facilitating removal of fleas and the like from both household pets and farm animals and most, if not all, are based upon a comb structure adapted to be passed through the hair of the animal and often including a receptacle from receiving insects combed from the animal, as in eary U.S. Pat. No. 506,643 to Price and U.S. Pat No. 656,990 to Marsh. Many insects, such as fleas, have very hard shells so that they are hard to exterminate by physical force and also they are very active so as to be difficult to grasp even though trapped in a receptacle. There has thus been proposed combs with materials for entrapping fleas or the like, as in U.S. Pat. No. 1,255,601 to Hare and an improvement thereon proposes the use of a curative, antiseptic or insecticidal solution on a sponge in a comb housing, as in U.S. Pat. No. 1,107,537 to McCann.

One of the major problems with devices of the type noted above is the sure removal of fleas or the like from animal hair that may widely vary in thickness and the sure and continuous transfer of such insects from a comb in the hair to a receptacle wherein they are exterminated.

SUMMARY OF INVENTION

There is provided by the present invention a device for removing fleas and the like from animals such as cats and dogs and automatically exterminating such insects. The present invention has a housing with an open front with a comb of particular specifications extending from the bottom of the opening. A brush roller is rotatably mounted across the open of the housing immediately above the comb with bristles contacting the top of the teeth of the comb along the entire length of the comb. A guard transparent extends over the roller into close proximity to the comb to substantially close the front of the housing. At least the roller, and preferably also the guard, is resiliently placed for movement into and partially out of the front of the housing. A resilient absorbent element, such as a sponge, is placed in the housing immediately behind the roller and contacting same over the length thereof for containing an insecticide to exterminate fleas and the like.

In use, the housing of the present invention is gripped by a person and the protruding comb is passed through the hair of an animal such as a household pet. The teeth of the comb are spaced apart a distance that is less than the length or width of a flea, for example, so that fleas will be picked up by the comb. The hair of the animal will contact the bristles of the brush roller as the comb is moved through the hair and the roller is thus rotated to pass the bristles thereof along the teeth of the comb to sweep fleas or the like from the comb onto the impregnated sponge whereat same are exterminated. The housing is separable for the purpose of cleaning and replacement of the insecticide-impregnated material.

BRIEF DESCRIPTION OF FIGURES

The present invention is illustrated with respect to a preferred embodiment thereof in the accompanying drawings wherein:

FIG. 1 is a perspective view of a preferred embodiment of the present invention;

FIG. 2 is a sectional view taken in the plane 2—2 of FIG. 1;

FIG. 3 is an enlarged partial sectional view taken in the plane 3—3 of FIG. 1;

FIG. 4 is a partial sectional view taken in the plane 4—4 of FIG. 2; and

FIG. 5 is an enlarge partial perspective view of the comb of the present invention.

DESCRIPTION OF PREFERRED EMBODIMENT

The present as illustrated in the accomanying drawings will be seen to include a housing 11 which may have a rectangular configuration with an open front. A front cover 12 is adapted to slide onto the front of the housing inclosing relation thereto. This front cover 12 is removed during use of the invention and is thus not shown in the remainder of the figures. The housing 11 is provided with a removable floor 13 which may be snapped into the bottom of the housing and may be removed to provide access to the interior of the housing.

At the open front 14 of the housing 11 there is provided a comb 16 which is mounted on the floor 13 of the housing and which includes teeth 17 extending forwardly of the housing. The front edge of the floor 13 is preferably centrally recessed as indicated at 18 to expose the teeth 17 and the back 19 of the comb is affixed, as by an adhesive 21, to the upper surface of the housing floor 13 immediately behind the front recess 18, thereof.

The comb 16 has the teeth 17 thereof formed with spacing between teeth which is that less than the minimum dimension of an insect to be removed from hair by the comb. It will thus be appreciated that passage of the comb through the hair of an animal will remove insect from the hair. Additionally, it is noted that the thickness or height of the leading edge of the comb teeth is also made less than the minumum dimension of an insect to be picked by the comb. While it is possible to form the comb with pointed teeth, it is generally preferable to form a very fine blunted edge in order to minimumize the possiblity of injuring an animal being combed. It is preferable for the comb to be formed with teeth 17 having a flat underside and upperwardly inclined top surfaces, as indicated, for example, in FIG. 3.

The present invention provides not only for combing insects from the hair of animals, but also for automatically removing such insects from the comb as it is passed through the hair, and at the same time accommodating a wide range of thickness of hair. A perffered embodiment of the present, as illustrated in the drawings, accomplishes the foregoing by the provision a brush roller 31 having bristles 32 thereabout and mounted for rotation about a roller axis 33 disposed above and parallel to the comb 16. The roller brush is mounted so that the bristles 32 engage the teeth of the comb in order to sweep insects from these teeth. The roller is adapted to be rotated in a counter clockwise direction as illustrated in FIG. 3 so that the bristles then move over and through the teeth of the comb toward the interior of the housing 11 when they are engaged by the hair of an animal being combed.

Mounting of the roller 31 may be accomplished by means of a guard 36 having an elongated top plate 37 with a depending front wall 38 and short depending side walls 39. The guard is preferably transparent so that the user may see the insects being removed from the hair of an animal during use of the invention. This guard is dimensioned to fit over the roller 31 with depending side walls 39 adjacent the ends of the roller and rotatably carrying the roller thereat. The top plate 37 of the guard 36 extends into the housing 11 immediately below the top thereof with the front of the guard and thus the outer edge of the roller extending forwardly from the housing over the teeth 17 of the comb. The guard 36 carrying the roller 31 is mounted for adjustable positioning in the front opening of the housing and this may be, for example, be accomplished by provision of a resiliently flexible line 41 extending through the roller along the axis thereof and through side walls 39 of the guard for connection to posts 42 formed in the housing on opposite sides of the guard. It will be seen that the guard 36 and the roller 31 carried thereby are movable in and out the front of the housing but normally maintained in the position illustrated in FIG. 2, for example, wherein the guard extends a short distance from the open front of the housing and the bristles 32 of the roller engage the teeth of the comb a short distance back from the front edge thereof.

Interiorly of the housing 11 there is also provided a transverse wall 51 extending across the housing beneath the top plate 37 of the guard 36 and defining a chamber 52 behind the roller 31. Within this chamber 52 there is disposed an absorbent material such a sponge 53 which substantially fills the chamber and which extends from the wall 51 to the bristles 32 of the roller. This sponge 53 preferably extends entirerly across the housing and may be slotted to accommodate the side walls 39 of the guard when the guard is moved into the housing by resilient flexing of the line 41. The material 53 is preferably of such a nature that it will subtantially retain its shape and will absorb or at least retain an insecticide with which it is adapted to be impregnated. Such insecticide would normally be provided in liquid form but may be provided in powder form if desired.

Considering now operation of the present invention, an again referring to the drawings it will be seen that the cover 12 initially closes and substantially seals the interior of the housing 11. With the housing sealed it is possible to provide the present invention with a sponge 53 impregnated with an insecticide prior to use and also to close the housing to minimize evaporation of the insecticide when the devices not in use. Alternatively the sponge 53 may be merely sprayed prior to each use. The sponge may also be provided as a separate item of sale as in a sealed bag or the like with the sponge already impregnated.

The present invention is employed by grasping the housing 11 in the hand of the user and combing an animal by moving the comb forwardly through the hair of the animal. The teeth 17 of the comb 16 will thus pick up and remove insects in the hair. The hair of the animal that passes through the comb will engage the bristles of the roller 31 to rotate the roller, which then continuously sweeps the comb toward the rear thereof to thus remove insects picked up by the comb. Insects are thus automatically moved from the comb to the impregnated sponge or absorbent material 53 whereat the insects will be exterminated by the insecticide carried by such material. It is known that fleas, for example, are very prone to jump and the front wall 38 of the guard 36 substantially prevents such insects from jumping back onto the animal after they have been picked up by the comb. The front end of the teeth 17 extends only shortly beyond the front wall 38 of the guard in normal position of the guard and for animals having sparse hair the guard would normally remain in this position during combing of the animal. On the other hand, some animals have much more hair and passing the comb therethrough will then cause a substanital amount of the animals hair to bear upon the front wall 38 of the guard so as so apply a force to the guard for sliding same inwardly by flexing of the resilient line 41. This then provides the present invention with the capability of automatically accommodating hair of different thickness and length. In this respect it is noted that the longer the hair of the animal the more hair will be engaged by the comb in a single pass so that the consequences are quite similar to a greater numbers of hairs.

The sponge or absorbent material 53 will seen to be entirely enclosed except for the front surface engaged by the bristles of the roller, and furthermore the roller itself will be seen to be substantially entirely enclosed except for the teeth of the comb. Consequently, insects picked up by the comb will be entrapped within in the present invention and automatically swept from the comb onto the absorbent material for extermination by an insecticide or the like carried by the material. The present invention provides a substantially automatic operation requiring only combing of an animal to remove and exterminate insects that may reside in the hair of such animal. It will be appreciated that the housing of the present invention may be readily opened by removing the floor 13 in order to clean the absorbent material if desired and to clean the comb and roller if necessary as by removing hair that may build up therein.

There is provided by the present invention a simple device for readily removing and exterminating insects from the hair of animals such as household pets. Although the present invention has been described above with respect to a single preferred embodiment, thereof, it would be appreciated that modifications and variations are possible within the scope of the present invention and, for example, the roller may be resiliently mounted directly upon the housing for rotation and deflection inwardly with the guard being provided as a resiliently deflectable unit secured to the housing. Various other modifications and variations are also possible and thus it is not intended to limit the present invention to the precise details of illustration or terms of description.

What is claimed is:

1. A flea catcher for removing insects from the hair animals and exterminating same comprising
   a housing having an open front,
   a comb having teeth extending from the open front of said housing,
   a roller having bristles, rotatably mounted across the open front of said housing for engagement with teeth of said comb and rotatable by engagement with hair being combed, and
   means adapted for impregnation with insecticide disposed across said housing immediately behind said roller.

2. The catcher of claim 1 further defined by means mounting said roller for resilient deflection in and out of the open front of said housing.

3. The catcher of claim 1 further defined by a guard disposed about the front, top and ends of said roller.

4. The catcher of claim 1 further defined by a transparent guard substantially closing the front of said housing and including at least a top plate engaging said housing in extension over the top of said roller and a depending front portion extending substantially to said comb in front of said roller.

5. The catcher of claim 4 further defined by said guard having end walls depending from said top plate and rotatably mounting said roller therebetween, and resiliently flexible means mounting said guard in the open front of said housing whereby said guard and roller are resiliently movable along teeth of said comb to automatically accommodate combing of thick and thin hair.

* * * * *